United States Patent
Frost et al.

(10) Patent No.: US 8,906,570 B2
(45) Date of Patent: Dec. 9, 2014

(54) SYSTEM AND METHOD FOR OBSERVING ANODE FLUID COMPOSITION DURING FUEL CELL START-UP

(75) Inventors: Patrick Frost, Rochester, NY (US); Daniel I Harris, Honeoye Falls, NY (US); Manish Sinha, Pittsford, NY (US); Gary M. Robb, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1447 days.

(21) Appl. No.: 12/361,042

(22) Filed: Jan. 28, 2009

(65) Prior Publication Data

US 2010/0190075 A1 Jul. 29, 2010

(51) Int. Cl.
*H01M 8/04* (2006.01)

(52) U.S. Cl.
CPC ........ *H01M 8/04231* (2013.01); *H01M 8/0447* (2013.01); *H01M 8/04388* (2013.01); *H01M 8/04402* (2013.01); *H01M 8/04805* (2013.01); *Y02E 60/50* (2013.01)
USPC .......................................... 429/443; 429/458

(58) Field of Classification Search
CPC ............. H01M 8/04231; H01M 8/04388; H01M 8/04402; H01M 8/0444; H01M 8/0447; H01M 8/04462; H01M 8/04746; H01M 8/04753; H01M 8/04791; H01M 8/04798
USPC ................. 429/443, 444, 456, 458
See application file for complete search history.

(56) References Cited

U.S. PATENT DOCUMENTS

| | | | |
|---|---|---|---|
| 2005/0129999 A1* | 6/2005 | Geschwindt et al. | 429/22 |
| 2006/0003204 A1* | 1/2006 | Callahan et al. | 429/22 |
| 2006/0024548 A1* | 2/2006 | Pechtold et al. | 429/34 |
| 2007/0077472 A1* | 4/2007 | Uehara et al. | 429/25 |
| 2007/0218330 A1* | 9/2007 | Naganuma | 429/25 |
| 2007/0243437 A1* | 10/2007 | Katano | 429/25 |
| 2008/0152972 A1* | 6/2008 | Igarashi et al. | 429/22 |
| 2008/0206622 A1* | 8/2008 | Mitsuta | 429/35 |
| 2008/0220303 A1* | 9/2008 | Yoshida | 429/25 |
| 2008/0312849 A1* | 12/2008 | Gade et al. | 702/47 |
| 2009/0104480 A1* | 4/2009 | Machuca et al. | 429/17 |

FOREIGN PATENT DOCUMENTS

WO WO 2005088755 A1 * 9/2005 ............. H01M 8/04

* cited by examiner

*Primary Examiner* — Edu E Enin-okut
(74) *Attorney, Agent, or Firm* — Fraser Clemens Martin & Miller LLC; J. Douglas Miller

(57) ABSTRACT

A fuel cell system including a fuel cell stack having a plurality of fuel cells, the fuel cell stack including an anode supply manifold and an anode exhaust manifold, a first valve in fluid communication with at least one of the anode supply manifold and the anode exhaust manifold, wherein the first valve includes an inlet for receiving a fluid flow and an outlet for exhausting a fluid, a sensor for measuring at least a fluid pressure at the inlet and the outlet of the first valve, wherein the sensor generates a sensor signal representing the pressure measurement, and a processor for receiving the sensor signal, analyzing the sensor signal, and determining a composition of a fluid in the fuel cell system based upon the analysis of the sensor signal.

18 Claims, 3 Drawing Sheets

SYSTEM AND METHOD FOR OBSERVING ANODE FLUID COMPOSITION DURING FUEL CELL START-UP

FIELD OF THE INVENTION

The invention relates to fuel cell systems. More particularly, the invention is directed to a fuel cell system and method for determining a composition of a fluid in an anode portion of the fuel cell system during start-up.

BACKGROUND OF THE INVENTION

In fuel cell systems, anode concentration at start-up is a key parameter for start/stop controls to meet emissions standards. Currently, anode concentration is determined by Beginning of Life (BOL) characterization from a lookup-table (LUT). However, BOL characterization may not be representative of an accurate anode concentration over time.

In current state-of-the-art production-focused fuel cell systems (FCS), system start-up is relatively inefficient in regards to hydrogen usage. Current FCS start-up methods typically include a stack anode header purge procedure and a stack anode flush procedure to prevent electrode catalyst degradation. The purge and flush procedures vary in duration and flow rate based on how long the FCS has been off (e.g. using a system "off-timer"). If the FCS has been off for a short time, it is assumed that a large amount of hydrogen remains in the stack. As the system ages, balance-of-plant components (such as valves) and the stack membrane can degrade. Such degradation can increase the rate of hydrogen diffusion from the anode. Because of this known behavior, the current start-up methods are calibrated for an end-of-life FCS. Therefore, the start-up method may implement a header purge when one is not necessary. Furthermore, a beginning-of-life FCS with exceptional (high-end) components and/or membranes may have an extremely slow hydrogen diffusion rate (slower than the calibration benchmark); in this case, a much longer off-time may not require as long a header purge or flush.

At the present time, there exists no high-performance (~ ms response time) production-feasible hydrogen concentration sensor for use internally in the FCS. With such a sensor, the passing of a hydrogen front through the header purge or flush valve could be detected, wherein the hydrogen front denotes a desired end-point of the header purge procedure or header flush procedure. Additionally, a means to detect the composition of a fluid in the FCS would make it possible to modify start-up procedures to ensure optimum operation.

It would be desirable to develop a fuel cell system and a method for determining a composition of a fluid in the fuel cell system, thereby providing a basis to tune and modify a start-up procedure of the fuel cell system to maximize efficiency, durability, and reliability of the fuel cell system from beginning-of-life to end-of-life.

SUMMARY OF THE INVENTION

Concordant and consistent with the present invention, a fuel cell system and a method for determining a composition of a fluid in the fuel cell system, thereby providing a basis to tune and modify a start-up procedure of the fuel cell system to maximize efficiency, durability, and reliability of the fuel cell system from beginning-of-life to end-of-life, has surprisingly been discovered.

In one embodiment, a fuel cell system comprises: a fuel cell stack having a plurality of fuel cells, the fuel cell stack including an anode supply manifold and an anode exhaust manifold, a first valve in fluid communication with at least one of the anode supply manifold and the anode exhaust manifold, wherein the first valve includes an inlet for receiving a fluid and an outlet for exhausting a fluid; a sensor for measuring a fluid pressure at the inlet and the outlet of the first valve, wherein the sensor generates a sensor signal representing the pressure measurement; and a processor for receiving the sensor signal, analyzing the sensor signal, and determining a composition of a fluid in the fuel cell system based upon the analysis of the sensor signal.

In another embodiment, a fuel cell system comprises: a fuel cell stack having a plurality of fuel cells, the fuel cell stack including an anode supply manifold and an anode exhaust manifold, a first valve in fluid communication with the anode supply manifold, wherein the first valve includes an inlet for receiving a fluid flow and an outlet for exhausting a fluid; a second valve in fluid communication with at least one of the anode exhaust manifold and the recycle loop, wherein the second valve includes an inlet for receiving a fluid and an outlet for exhausting a fluid; at least one sensor for measuring a fluid pressure at the inlet and the outlet of each of the first valve and the second valve, wherein the at least one sensor generates a sensor signal representing the pressure measurement; and a processor for receiving the sensor signal, analyzing the sensor signal, and determining a composition of a fluid in the fuel cell system based upon the analysis of the sensor signal.

The invention also provides methods for determining a composition of a fluid in a fuel cell system.

One method comprises the steps of: providing a fuel cell stack having a plurality of fuel cells, the fuel cell stack including an anode supply manifold and an anode exhaust manifold, providing a first valve in fluid communication with at least one of the anode supply manifold and the anode exhaust manifold, wherein the first valve includes an inlet for receiving a fluid and an outlet for exhausting a fluid; measuring a fluid pressure at the inlet and the outlet of the first valve; and determining a composition of a fluid within the first valve based upon the measurements of the fluid pressure.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
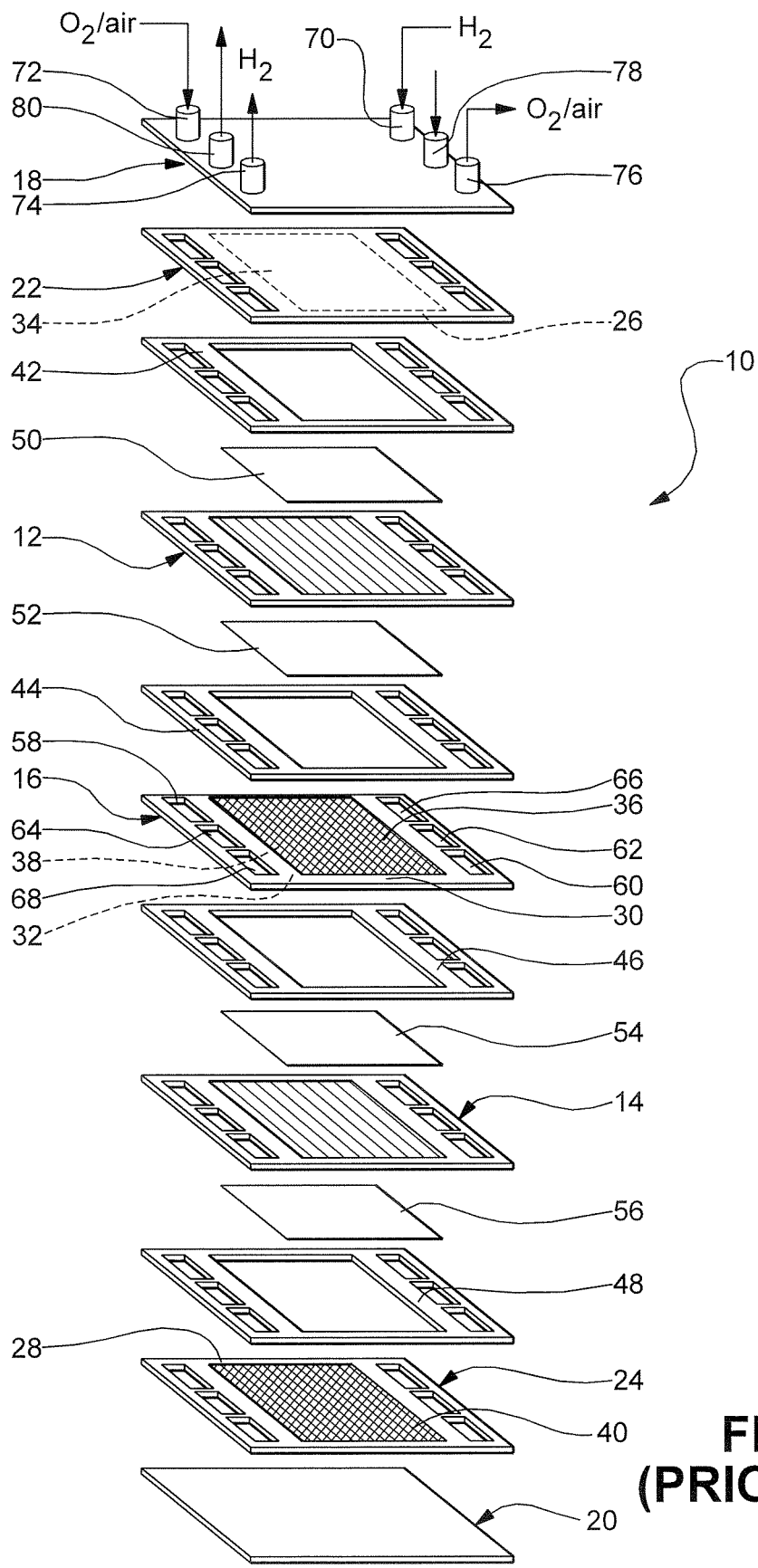
FIG. 1 is a schematic exploded perspective view of a PEM fuel cell stack as known in the art.

For simplicity, only a two-cell stack (i.e. one bipolar plate) is illustrated and described in FIG. 1, it being understood that a typical fuel cell stack will have many more such cells and bipolar plates.

FIG. 1 illustrates a PEM fuel cell stack 10 according to the prior art. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, include a plurality of grooves or channels 34, 36, 38, 40 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent to the diffusion media 52 on the anode face of the MEA 12. The bipolar plate 16 is further disposed adjacent the diffusion media 54 on the cathode face of the MEA 14.

The fuel cell stack 10 further includes a cathode supply manifold 58 and a cathode exhaust manifold 60, a coolant supply manifold 62, a coolant exhaust manifold 64, an anode supply manifold 66, and an anode exhaust manifold 68. The supply manifolds 58, 62, 66 and the exhaust manifolds 60, 64, 68 are formed by alignment of adjacent apertures formed in the bipolar plate 16, apertures formed in the gaskets 42, 44, 46, 48, and apertures formed in the end plates 22, 24. A hydrogen gas is supplied to the fuel cell stack 10 through the anode supply manifold 66 via an anode inlet conduit 70. An oxidant gas is supplied to the fuel cell stack 10 through the cathode supply manifold 58 of the fuel cell stack 10 via a cathode inlet conduit 72. An anode outlet conduit 74 and a cathode outlet conduit 76 are provided for the anode exhaust manifold 68 and the cathode exhaust manifold 60, respectively. A coolant inlet conduit 78 and a coolant outlet conduit 80 are in fluid communication with the coolant supply manifold 62 and the coolant exhaust manifold 64 to provide a flow of a liquid coolant there through. It is understood that the configurations of the various inlets 70, 72, 78 and outlets 74, 76, 80 in FIG. 1 are for the purpose of illustration, and other configurations may be chosen as desired.

Figure 2:
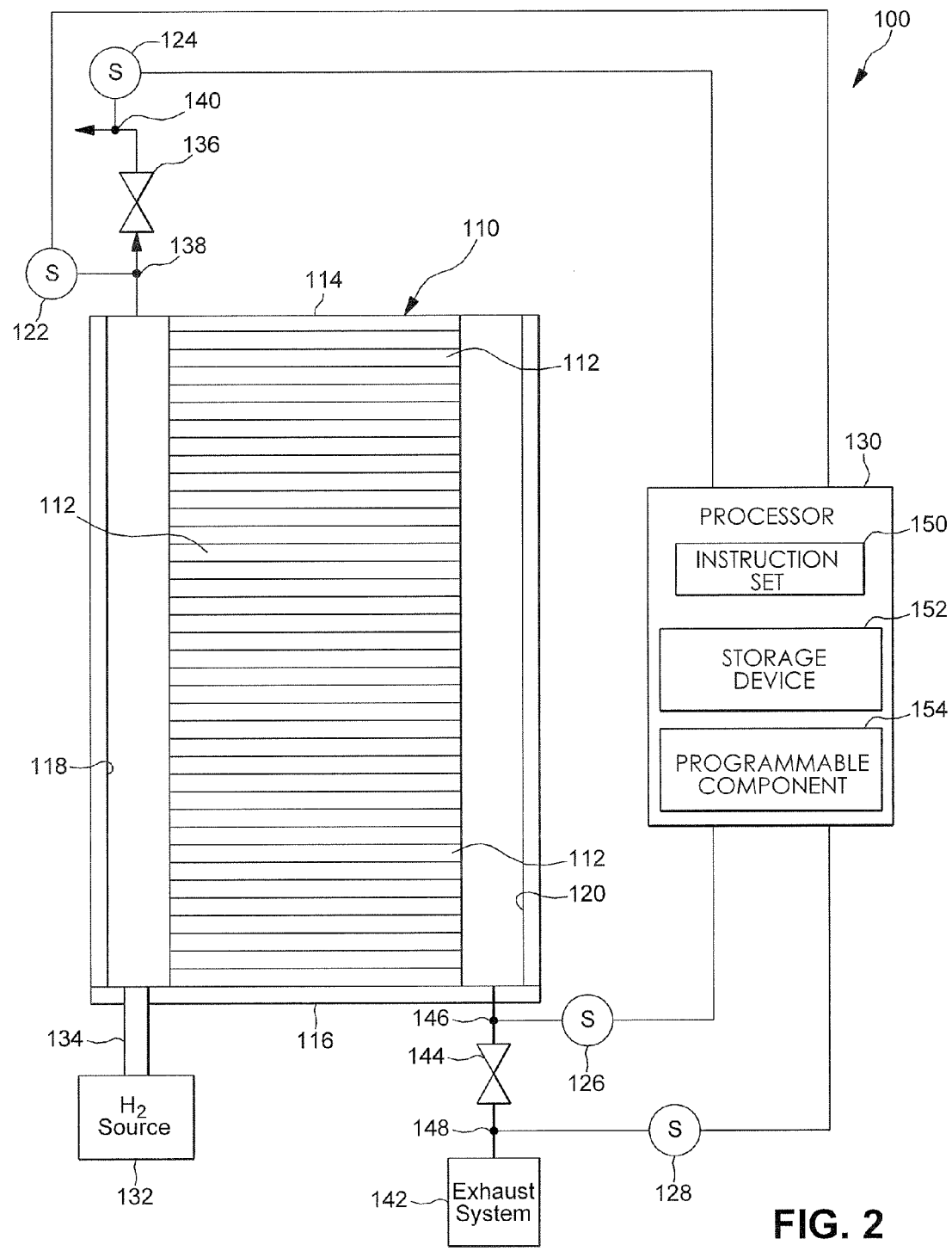
FIG. 2 is a schematic cross-sectional view of a fuel cell system according to an embodiment of the present invention.

FIG. 2 shows an anode side of a fuel cell system 100 according to an embodiment of the invention. The fuel cell system 100 includes a fuel cell stack 110 having a plurality of fuel cells 112. Each of the fuel cells 112 has an anode (not shown) and a cathode (not shown) with an electrolyte membrane (not shown) disposed therebetween. The fuel cell stack 110 further includes a first end 114 and a second end 116. As described herein, the first end 114 is known as the "dry end" and the second end 116 is known as the "wet end."

In the embodiment shown, the fuel cell system 100 further includes an anode supply manifold 118, an anode exhaust manifold 120, a plurality of sensors 122, 124, 126, 138, and a processor 130. It is understood that additional components and systems may be included in the fuel cell system 100 such as a recycle sub-system, for example.

The anode supply manifold 118 is in communication with the anodes of the fuel cells 112 and provides fluid communication between a source of hydrogen 132 and the fuel cells 112. It is understood that other fluid sources may be used such as nitrogen and air, for example. As shown, the anode supply manifold 118 receives a flow of gaseous hydrogen through an anode inlet conduit 134 from the source of hydrogen 132. The anode inlet conduit 134 defines a volume between the source of hydrogen 132 and the anode supply manifold 118. It is understood that the anode inlet conduit 134 may have any desired cross-sectional area and may further include a chamber, for example. As illustrated, the fuel cell system 100 includes a first valve 136, also known as a purge valve, in fluid communication with the anode supply manifold 118. The first valve 136 is disposed at the first end 114 of the fuel cell stack 110, spaced from the anode inlet conduit 134. As such, the first valve 136 includes an inlet 138 for receiving a fluid flow and an outlet 140 for exhausting a fluid when the first valve 136 is in an open position.

The anode exhaust manifold 120 of the fuel cell system 100 provides fluid communication between the anodes of the plurality of fuel cells 112 and an exhaust system 142. The anode exhaust manifold 120 receives the fluid flowing through the anodes of the fuel cells 112. The fluid caused to flow through the anodes may be gaseous hydrogen, air, or water. A second valve 144 is in fluid communication with the anode exhaust manifold 120 and is disposed at the second end 116 of the fuel cell stack 110. The second valve 144 facilitates purging or flushing of a fluid from the anode exhaust manifold 120. It is understood that the second valve 144 may be disposed at the first end 114 of the fuel cell stack 110, if desired. It is further understood that the second valve 144 may flush fluid to a cathode inlet (not shown), for example. Specifically, the second valve 144 includes an inlet 146 for receiving a fluid flow and an outlet 148 for exhausting a fluid when the second valve 144 is in an open position.

The sensors 122, 124, 126, 128 provide a means to measure pre-determined characteristics and levels at various positions in the fuel cell system 100. Specifically, each of the sensors 122, 124, 126, 128 measures a pressure level and transmits a sensor signal to the processor 130, wherein the sensor signal represents data and information related to pressure and other pre-determined characteristics. It is understood that the sensor 122, 124, 126, 128 may measure an absolute pressure, a delta pressure, or a combination of absolute and delta pressure. As illustrated, the first sensor 122 is disposed between the anode supply manifold 118 and the first valve 136, wherein the first sensor 122 is positioned to measure at least the fluid pressure at the inlet 138 of the first valve 136. The second sensor 124 is positioned to measure at least the fluid pressure at the outlet 140 of the first valve 136. The third sensor 126 is disposed between the anode exhaust manifold 120 and the second valve 144 and measures at least the fluid pressure at the inlet 146 of the second valve 144. The fourth sensor 128 is positioned to measure at least the fluid pressure at the outlet 148 of the second valve 144. It is understood that any number of sensors may be positioned in any number of locations throughout the fuel cell system 100. It is further understood that the sensors 122, 124, 126, 128 may measure any pre-determined characteristic or level such as temperature, for example.

The processor 130 illustrated is in communication with the sensors 122, 124, 126, 128. As such, the processor 130 is adapted to receive each of the sensor signals transmitted from the sensors 122, 124, 126, 128, analyze the sensor signals, and determine a composition of a fluid in the fuel cell system 100 in response to the analysis of the sensor signals.

As shown, the processor 130 analyzes and evaluates the sensor signals based upon an instruction set 150. The instruction set 150, which may be embodied within any computer readable medium, includes algorithms, formulas, and processor executable instructions for configuring the processor 130 to perform a variety of tasks. It is understood that the processor 130 may execute a variety functions such as controlling the functions of the sensors 122, 124, 126, 128.

In certain embodiments, the processor 130 may include a storage device 152. The storage device 152 may be a single storage device or may be multiple storage devices. Furthermore, the storage device 152 may be a solid state storage system, a magnetic storage system, an optical storage system or any other suitable storage system or device. It is understood that the storage device 152 is adapted to store the instruction set 150. Other data and information may be stored in the storage device 152, as desired.

The processor 130 may further include a programmable component 154. It is understood that the programmable component 154 may be in communication with any other component of the fuel cell system 100 such as the sensors 122, 124, 126, 128, for example. In certain embodiments, the programmable component 154 is adapted to manage and control processing functions of the processor 130. Specifically, the programmable component 154 is adapted to control the analysis of the sensor signals. It is understood that the programmable component 154 may be adapted to store data and information on the storage device 152, and retrieve data and information from the storage device 152.

Figure 3:
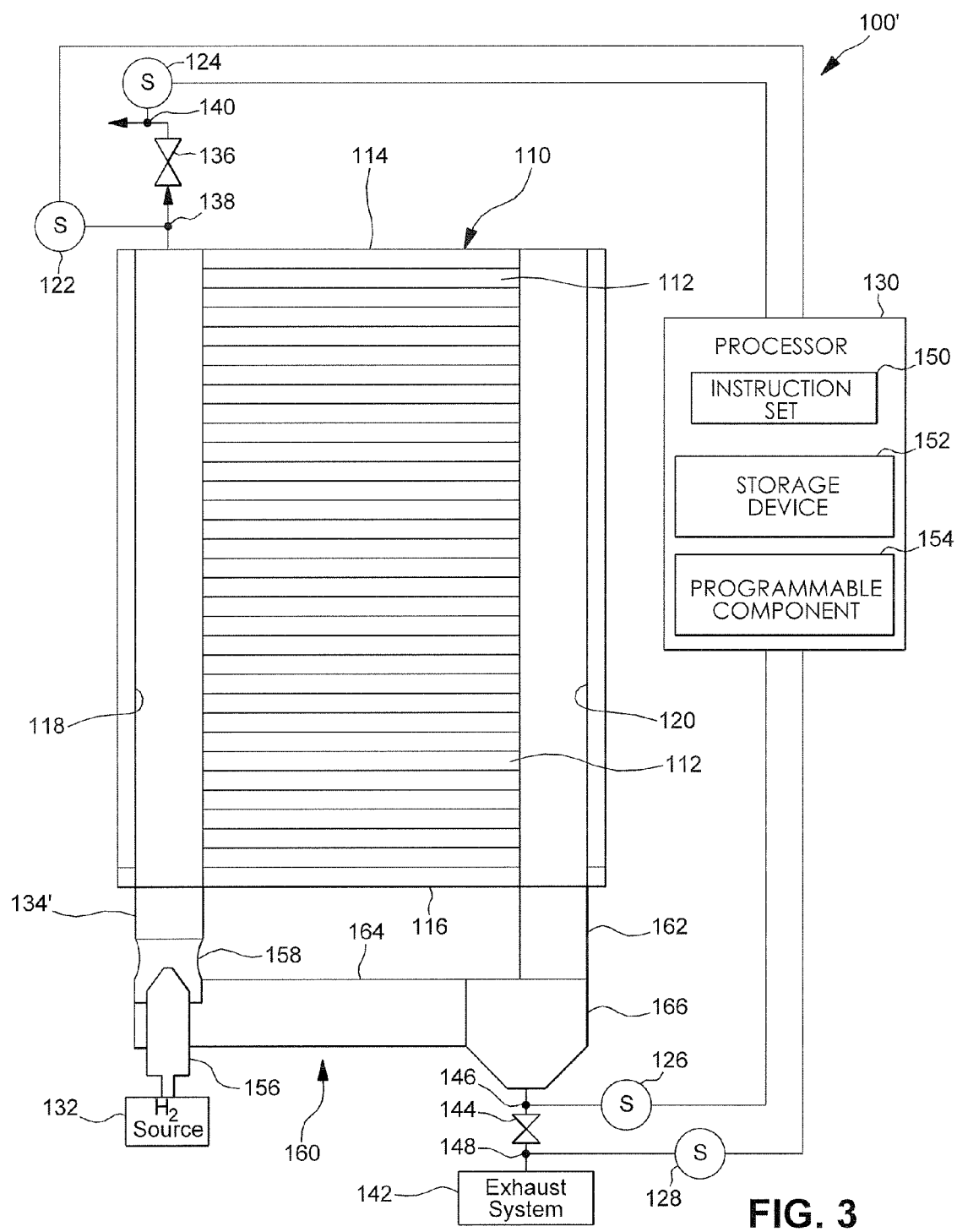
FIG. 3 is a schematic cross-sectional view of the fuel cell system according to another embodiment of the present invention.

FIG. 3 illustrates an anode side of a fuel cell system 100' according to another embodiment of the present invention similar to the fuel cell system 100 of FIG. 2, except as described below. Structure repeated from the description of FIG. 2 includes the same reference numeral. Variations of structure shown in FIG. 2 include the same reference numeral and a prime (') symbol. As shown in FIG. 3 shows, the fuel cell system 100 further includes a fuel injector 156, a jet pump 158, and a recycle loop 160. It is understood that additional components and systems may be included in the fuel cell system 100', as desired.

The fuel injector 156 and the jet pump 158 are disposed between the source of hydrogen 132 and the anode inlet conduit 134'. The injector 156 and the jet pump 158 provide control over the flow of hydrogen into the anode inlet conduit 134'. It is understood that additional components may be in communication with the source of hydrogen 132 and the anode inlet conduit 134' such as a pressure regulator and recirculation pump, for example. Other components or systems may be in communication with the anode inlet conduit 134', as desired.

The anode exhaust manifold 120 of the fuel cell system 100' provides fluid communication between the anodes of the fuel cells 112, and at least one of the exhaust system 142 and the recycle loop 160. The anode exhaust manifold 120 receives a fluid flowing through the anodes of the fuel cells 112. As a non-limiting example, the fluid caused to flow through the anodes may be gaseous hydrogen, air, or water. Other fluids may be used, as desired. In the embodiment shown, the fuel cell system 100' includes an anode exhaust conduit 162 in fluid communication with the anode exhaust manifold 120. The anode exhaust conduit 162 defines a volume between the anode exhaust manifold 120 and at least one of the exhaust system 142 and the recycle loop 160. It is understood that the anode exhaust conduit 162 may have any desired cross-sectional area and may further include a chamber, for example.

The recycle loop 160 provides fluid communication between the anode exhaust manifold 120 and the anode supply manifold 118. In certain embodiments, the recycle loop 160 includes at least a portion of the anode inlet conduit 134', at least a portion of the anode exhaust conduit 162, a recycle conduit 164, and a water separator 166. However, it is understood that other components may be included, as desired.

The recycle conduit 164 defines a volume between the anode inlet conduit 134' and the anode exhaust conduit 162. It is understood that the recycle conduit 164 may have any desired cross-sectional area and may further include a chamber, for example. In the embodiment shown, the recycle conduit 164 is in fluid communication with the water separator 166 and the jet pump 158. It is understood that the recycle conduit 164 may be in direct communication with at least one of the anode inlet conduit 134', the anode supply manifold 118, the anode exhaust manifold 120, and the anode exhaust conduit 162. It is further understood that other components or systems may be disposed between the recycle conduit 164 and at least one of the anode inlet conduit 134', the anode supply manifold 118, the anode exhaust manifold 120, and the anode exhaust conduit 162, as desired.

The water separator 166 is disposed between the anode exhaust conduit 162 and the recycle conduit 164 and is adapted to remove excess humidification or product water from the fluid received from the anode exhaust conduit 162. As such, the water separator 166 is in fluid communication with the second valve 144. The second valve 144 drains or bleeds the product water collected in the water separator 144. As shown, the second valve 144 is in further fluid communication with the exhaust system 142 and is adapted to drain the product water into the exhaust system 142. However, it is understood that the second valve 144 may drain the product water into any system or device, as desired. It is further understood that additional valves and control devices may be included, as desired.

In use, each of the sensors 122, 124, 126, 128, measure fluid pressure at various positions in the fuel cell system 100, 100'. Each of the sensors 122, 124, 126, 128 transmits the sensor signal representing the measured data and information to the processor 130. Once received, the processor 130 analyzes the data and information represented by each of the sensor signals. In certain embodiments, the processor 130 analyzes the data and information based upon the ideal gas law and a $k_v$ orifice model to determine the composition of a fluid in the fuel cell system 100, 100'. The use of pressure dynamics with the $k_v$ orifice model allows the processor 130 to determine the molar mass of the fluid exiting the fuel cell system 100, 100' during a purge and/or flush procedure.

Specifically, the ideal gas law provides:

$$n_{Tot}^{An} = \frac{p^{An} \cdot V^{An}}{R \cdot T}$$

$$\Rightarrow \dot{n}_{net}^{An} = \frac{\dot{p}^{An} \cdot V^{An}}{R \cdot T}$$

Where $p^{An}$ is the anode pressure (in kPa), $V^{An}$ is the anode volume (in L), R is the ideal gas constant (~8.3144 kPa L mol-1 K-1), and T is the anode fluid temperature (in K). It is understood that the temperature may be assumed to remain constant, so that the derivative of the ideal gas law provides net flow rate as a function of pressure change.

Additionally, the $k_v$ orifice model provides:

$$\dot{n}^{vlv} = \frac{k_v^{vlv}}{4.633}\sqrt{\frac{p_{vlv,in}^2 - p_{vlv,out}^2}{M_w \cdot T}}$$

Where $\dot{n}^{vlv}$ is the orifice flow rate (in mol/s), $k_v$ is the orifice flow parameter (in m3/h), $P_{vlv,in}$ is the upstream orifice pressure (in kPa), $P_{vlv,out}$ is the downstream orifice pressure (in kPa), $M_w$ is the molecule molar mass of the gas flowing through the orifice (in g/mol), and T is the temperature of the gas flowing through the orifice (in K).

During a flush procedure in the fuel cell system 100, 100', a shorting resistor is used to suppress cell voltages in the stack. Inevitably, if the partial pressure of hydrogen on both sides of the cell are not the same, some current will be drawn. The total anode hydrogen consumption due to the current is:

$$\dot{n}^{consum} = \frac{j \cdot A \cdot N_{cell}}{2 \cdot F}$$

Where J is the current density drawn by the stack (in A/cm2), A is the active area of the stack (in cm2), $N_{cell}$ is the number of cells in the stack, F is the Faraday constant (~96485 A s mol-1)

Since the anode pressure control sets the hydrogen injector flow rate (which in turn is converted to duty cycle), the net molar flow rate into the stack anode is:

$$\dot{n}_{net}^{An} = \dot{n}^{injector} - \dot{n}^{vlv} - \dot{n}^{consum}$$

Where $\dot{n}^{injector}$ is the injector flow rate (in mol/s) [IN], $\dot{n}^{vlv}$ is the valve flow rate (in mol/s), and $\dot{n}^{consum}$ is the consumption rate during flush only (in mol/s).

The above equations are combined to form a composition equation, providing:

$$\frac{\dot{p}^{An} \cdot V^{An}}{R \cdot T} = \dot{n}^{injector} - \frac{j \cdot A \cdot N_{cell}}{2 \cdot F} - \frac{k_v^{vlv}}{4.633}\sqrt{\frac{p_{vlv,in}^2 - p_{vlv,out}^2}{M_w \cdot T}} \Rightarrow$$

$$M_w = \left\{\frac{k_v}{4.633 \cdot \left(\dot{n}^{injector} - \frac{\dot{p}_{vlv,in} \cdot V}{R \cdot T} - \frac{j \cdot A \cdot N_{cell}}{2 \cdot F}\right)}\right\}^2 \cdot \frac{p_{vlv,in}^2 - p_{vlv,out}^2}{T}$$

All quantities in the right-hand side of the composition equation are measured, known constants, or estimated. To determine the fluid composition with the assumption that the fluid in the anode portion is substantially hydrogen or nitrogen/air (the similarity in molar mass makes nitrogen/air indistinguishable in the calculation), the matrix equation below must be solved:

$$\begin{bmatrix} 1 & 1 \\ M_w^{H_2} & M_w^{N_2} \end{bmatrix} \begin{bmatrix} y_{H_2} \\ y_{N_2} \end{bmatrix} = \begin{bmatrix} 1 \\ M_w \end{bmatrix}$$

Where: $M_w^{H_2}$ is the molar mass of hydrogen (2.016 g/mol), $M_w^{N_2}$ is the molar mass of nitrogen or air (~28.0-28.964 g/mol), $M_w$ is the molar mass calculated from equation in (g/mol), $y_{H_2}$ is the mole fraction of hydrogen in the anode, $y_{N_2}$ is the mole fraction of nitrogen in the anode.

As such, the processor 130 provides the concentration and molar flow rate of a fluid in the fuel cell system 100, 100'. In certain embodiments, the information gained from the processor 130 provides a basis to modify an exit criterion for the anode flush or header purge procedure. Specifically, when the calculated molar mass of a fluid through the first valve 136 and second valve 144 achieves a certain threshold, the fuel cell system 100, 100' exits the anode header purge and/or anode flush procedure and proceeds to a next step in the start-up.

As another example, the information gained from processor 130 provides an emissions control for start-up. Specifically, a user can estimate the exhaust concentration of $H_2$. The following are example methods to control $H_2$ emissions based on the information from the processor 130 and a cathode compressor flow rate: limit hydrogen addition flow rate; decrease valve coefficient (increasing anode pressure); and increase exhaust dilution flow rate.

As a further example, the information gained from the processor 130 provides a means to diagnose valve and injector failures. Specifically, with an anode valve commanded open, an excessive anode pressure rise proportional to expected rise (based on injector valve model) can be diagnosed as an injector stuck open or a valve stuck closed.

As a further example, the information gained from the processor 130 provides a basis to modify a start-up procedure. Specifically, when the calculated molar mass of the fluid through a valve exceeds a certain bound, the information may be used to modify the start-up. Where the hydrogen concentration in the anode is calculated to be very low on a pre-determined scale, the start-up procedure may be modified in at least one of the following manners: extend the anode fill state; change the rate of the anode fill; and decrease the cathode fill time. Where the hydrogen concentration in the anode is calculated to be very high on a pre-determined scale, the start-up procedure may be modified in at least one of the following manners: shorten or remove the anode fill state; change the rate of the anode fill; and increase the cathode fill time.

Accordingly, the fuel cell system 100, 100' and method for determining a fluid composition in the fuel cell system 100, 100' detect a composition of a fluid flowing through the fuel cell stack 110 during a fuel cell start-up. The fuel cell system 100, 100' and method provide a basis to tune and modify the fuel cell start-up to maximize efficiency, durability, and reliability of the fuel cell system 100, 100' from beginning-of-life to end-of-life.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fuel cell system comprising:
  a fuel cell stack having a first end, a second end, and a plurality of fuel cells, the fuel cell stack including an anode supply manifold and an anode exhaust manifold;
  a first valve disposed at the first end of the fuel cell stack, the first valve in direct fluid communication with the anode supply manifold, wherein the first valve includes an inlet for receiving a fluid from the anode supply manifold and an outlet for exhausting a fluid from the anode supply manifold;

an anode inlet conduit disposed at the second end of the fuel cell stack, the anode inlet conduit providing fluid communication between the anode supply manifold and a source of hydrogen, wherein the first valve is spaced from the anode inlet conduit;

a first sensor for measuring a first fluid pressure at the inlet of the first valve and a second sensor for measuring a second fluid pressure at the outlet of the first valve, wherein the first sensor generates a first sensor signal representing the first pressure measurement and the second sensor generates a second sensor signal representing the second pressure measurement; and a processor for receiving the first sensor signal and the second sensor signal, analyzing the first sensor signal and the second sensor signal, and determining a composition of a fluid in the fuel cell system based upon the analysis of the first sensor signal and the second sensor signal.

2. The fuel cell system according to claim 1, further comprising an anode exhaust conduit in fluid communication with the anode exhaust manifold.

3. The fuel cell system according to claim 1, further comprising at least one of a jet pump in fluid communication with the anode supply manifold, an injector in fluid communication with the anode supply manifold, and a recycle loop in fluid communication with at least one of the anode exhaust manifold and the anode supply manifold.

4. The fuel cell system according to claim 1, further comprising a second valve in fluid communication with the anode exhaust manifold, wherein the second valve includes an inlet for receiving a fluid flow and an outlet for exhausting a fluid.

5. The fuel cell system according to claim 1, wherein the processor includes at least one of a storage device and a programmable component.

6. The fuel cell system according to claim 1, wherein the analysis performed by the processor is based upon an instruction set including processor executable instructions based upon the ideal gas law and a $k_v$ orifice model to determine the composition of a fluid in the fuel cell system.

7. A fuel cell system comprising:
a fuel cell stack having a first end, a second end, and a plurality of fuel cells, the fuel cell stack including an anode supply manifold and an anode exhaust manifold;
a first valve disposed at the first end of the fuel cell stack, the first valve in direct fluid communication with the anode supply manifold, wherein the first valve includes an inlet for receiving a fluid flow from the anode supply manifold and an outlet for exhausting a fluid from the anode supply manifold;
an anode inlet conduit disposed at the second end of the fuel cell stack, the anode inlet conduit providing fluid communication between the anode supply manifold and a source of hydrogen, wherein the first valve is spaced from the anode inlet conduit;
a second valve in fluid communication with at least one of the anode exhaust manifold and the recycle loop, wherein the second valve includes an inlet for receiving a fluid and an outlet for exhausting a fluid;
a first sensor for measuring a first fluid pressure at the inlet of the first valve, a second sensor for measuring a second fluid pressure at the outlet of the first valve, a third sensor for measuring a third fluid pressure at the inlet of the second valve, and a fourth sensor for measuring a fourth fluid pressure at the outlet of the second valve, wherein the first sensor generates a first sensor signal representing the first pressure measurement, the second sensor generates a second sensor signal representing the second pressure measurement, the third sensor generates a third sensor signal representing the third pressure measurement, and the fourth sensor generates a fourth sensor signal representing the fourth pressure measurement; and a processor for receiving the first sensor signal, the second sensor signal, the third sensor signal, and the fourth sensor signal, analyzing the first sensor signal, the second sensor signal, the third sensor signal, and the fourth sensor signal, and determining a composition of a fluid in the fuel cell system based upon the analysis of the first sensor signal, the second sensor signal, the third sensor signal, and the fourth sensor signal.

8. The fuel cell system according to claim 7, further comprising in fluid communication with the anode exhaust manifold.

9. The fuel cell system according to claim 7, further comprising at least one of a jet pump in fluid communication with the anode supply manifold, an injector in fluid communication with the anode supply manifold, and a recycle loop in fluid communication with at least one of the anode exhaust manifold and the anode supply manifold.

10. The fuel cell system according to claim 7, wherein the second valve is disposed at a second end of the fuel cell stack.

11. The fuel cell system according to claim 7, wherein the at least one sensor measures at least one of an absolute pressure and a delta pressure.

12. The fuel cell system according to claim 7, wherein the analysis performed by the processor is based upon an instruction set including processor executable instructions based upon the ideal gas law and a $k_v$ orifice model to determine the composition of a fluid in the fuel cell system.

13. A method for determining a composition of a fluid in a fuel cell system, the method comprising the steps of:
providing a fuel cell stack having a first end, a second end, and a plurality of fuel cells, the fuel cell stack including an anode supply manifold and an anode exhaust manifold;
providing a first valve disposed at the first end of the fuel cell stack, the first valve in direct fluid communication with the anode supply manifold, wherein the first valve includes an inlet for receiving a fluid from the anode supply manifold and an outlet for exhausting a fluid from the anode supply manifold;
providing an anode inlet conduit disposed at the second end of the fuel cell stack, the anode inlet conduit providing fluid communication between the anode supply manifold and a source of hydrogen, wherein the first valve is spaced from the anode inlet conduit;
measuring a fluid pressure at the inlet and the outlet of the first valve; and
determining a composition of a fluid within the first valve based upon the measurements of the fluid pressure.

14. The method according to claim 13, further comprising the step of providing an anode exhaust conduit in fluid communication with the anode exhaust manifold.

15. The method according to claim 13, further comprising the step of providing at least one of a jet pump in fluid communication with the anode supply manifold, an injector in fluid communication with the anode supply manifold, and a recycle loop in fluid communication with at least one of the anode supply manifold and the anode exhaust manifold.

16. The method according to claim 13, further comprising the steps of:
providing a second valve in fluid communication with at least one of the anode supply manifold and the anode exhaust manifold, wherein the second valve includes an inlet for receiving a fluid flow and an outlet for exhausting a fluid;

measuring a fluid pressure at the inlet and the outlet of the second valve;

determining a composition of a fluid within the second valve based upon the measurements of the fluid pressure.

17. The method according to claim 13, wherein the fluid pressure at the inlet and the outlet of each of the first valve and the second valve is measured by at least one fluid pressure sensor.

18. The method according to claim 13, wherein the composition of the fluid is determined by a processor having an instruction set including processor executable instructions based upon the ideal gas law and a $k_v$ orifice model.

* * * * *